United States Patent
Westman et al.

(10) Patent No.: US 11,170,617 B2
(45) Date of Patent: *Nov. 9, 2021

(54) ELONGATED WIRELESS SENSOR ASSEMBLY

(71) Applicant: Sensative AB, Lund (SE)

(72) Inventors: Fredrik Westman, Lund (SE); Anders Hedberg, Lund (SE)

(73) Assignee: Sensative AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,974

(22) Filed: Jun. 10, 2020

(65) Prior Publication Data

US 2020/0302762 A1    Sep. 24, 2020

Related U.S. Application Data

(63) Continuation of application No. 15/924,914, filed on Mar. 19, 2018, now Pat. No. 10,720,033, which is a
(Continued)

(30) Foreign Application Priority Data

Sep. 19, 2013 (SE) .................................... 1351088-8

(51) Int. Cl.
    *G08B 13/08*      (2006.01)
    *G08B 13/14*      (2006.01)
(Continued)

(52) U.S. Cl.
CPC ........... *G08B 13/08* (2013.01); *G08B 13/149* (2013.01); *G08B 13/22* (2013.01); *G06F 1/3296* (2013.01);
(Continued)

(58) Field of Classification Search
CPC ........ G08B 13/00; G08B 13/02; G08B 13/08; G08B 13/22; G08B 13/24; H01H 36/00;
(Continued)

(56) References Cited

U.S. PATENT DOCUMENTS 5,083,110 A    1/1992   Ahrens
5,766,124 A    6/1998   Polson
(Continued)

FOREIGN PATENT DOCUMENTS

CN        104502034 A     4/2015
DE    202009004527       6/2009
(Continued)

*Primary Examiner* — Benyam Haile
(74) *Attorney, Agent, or Firm* — Dinsmore & Shohl LLP; Douglas L. Wathen

(57) ABSTRACT

A sensor assembly as part of a wireless alarm system for building entrances like windows and doors. An elongated sensor assembly for detecting a change of state comprising at least one sensor switch configured to detect a given state and a change of state between the given state and at least one other state, a microprocessor configured to detect the change of state of the at least one sensor switch, an antenna system, a wireless transmitter configured to receive a signal from the microprocessor identifying a change of the state of the at least one sensor switch and transmit the signal by means of the antenna system, and a power source for providing electric power, wherein the at least one sensor switch, the microprocessor, the antenna system, the wireless transmitter, and the power source are incorporated in the elongated sensor assembly having a maximum height of less than 5 mm.

20 Claims, 13 Drawing Sheets

Related U.S. Application Data continuation-in-part of application No. 15/023,085, filed as application No. PCT/EP2014/069959 on Sep. 19, 2014, now Pat. No. 9,953,496.

(51) Int. Cl.
| | |
|---|---|
| *G08B 13/22* | (2006.01) |
| *H01H 9/02* | (2006.01) |
| *G06F 1/3296* | (2019.01) |
| *H01H 50/16* | (2006.01) |
| *G08B 13/24* | (2006.01) |
| *G08B 13/00* | (2006.01) |

(52) U.S. Cl.
CPC .............. *G08B 13/00* (2013.01); *G08B 13/24* (2013.01); *H01H 9/02* (2013.01); *H01H 50/16* (2013.01)

(58) Field of Classification Search
CPC ........... H01H 3/00; H01H 3/02; H01H 3/161; H01H 3/162; H01H 3/163; H01H 3/18
See application file for complete search history.

(56) References Cited

U.S. PATENT DOCUMENTS

| | | | |
|---|---|---|---|
| 6,853,093 B2 | 2/2005 | Cohen et al. | |
| 7,004,784 B2 | 2/2006 | Castle | |
| 7,881,882 B2 | 2/2011 | Maxey et al. | |
| 8,884,241 B2 | 11/2014 | Hall et al. | |
| 9,245,439 B2 | 1/2016 | Lamb et al. | |
| 9,324,222 B2 | 4/2016 | Buckley et al. | |
| 2005/0024207 A1 | 2/2005 | Schebel et al. | |
| 2005/0068176 A1 | 3/2005 | Ko | |
| 2005/0134471 A1 | 6/2005 | Kovach et al. | |
| 2005/0195101 A1 | 9/2005 | Stevens et al. | |
| 2006/0210104 A1 | 9/2006 | Shennib et al. | |
| 2007/0075859 A1 | 4/2007 | Garavuso et al. | |
| 2009/0231774 A1 | 9/2009 | Owen et al. | |
| 2011/0228065 A1* | 9/2011 | Koyama ............. | H04B 1/1607 348/65 |
| 2012/0268274 A1 | 10/2012 | Wieser | |
| 2014/0247128 A1 | 9/2014 | Young | |
| 2015/0276544 A1 | 10/2015 | Osoinach et al. | |
| 2017/0076567 A1* | 3/2017 | Soldner ................. | G08B 13/08 |

FOREIGN PATENT DOCUMENTS

| | | | | |
|---|---|---|---|---|
| EP | 1325479 B1 | | 12/2004 | |
| GB | 2356077 A | * | 5/2001 | ............. G08B 13/08 |
| GB | 2356077 A | | 5/2001 | |

\* cited by examiner

ELONGATED WIRELESS SENSOR ASSEMBLY

CROSS-REFERENCE TO RELATED APPLICATIONS

This application is a continuation of Ser. No. 15/924,914, filed Mar. 19, 2018, which is a continuation-in-part of U.S. application Ser. No. 15/023,085, filed on Mar. 18, 2016, which is the U.S. national stage of PCT/EP2014/069959 filed Sep. 19, 2014, which claims priority of Swedish Patent Application No. 1351088-8 filed Sep. 19, 2013; the entire content of which is incorporated herein by reference.

FIELD OF THE INVENTION

The present disclosure relates to a sensor assembly as part of a wireless alarm system or smart home system for building entrances like windows and doors. The present disclosure further relates to an alarm kit and an alarm system comprising the herein disclosed sensor assembly.

BACKGROUND OF THE INVENTION

Illegal intrusion and burglary is a threat to nearly all property owners or occupiers. Therefore, the alarm systems are being installed in increasing numbers all over the world. Many building entrances, such as windows and doors are retrofitted with the intrusion alarm systems. Although these systems are primarily intended to detect breech and illegal entry, these can also detect entrants at the open building entrances.

Security sensors, which detect a change of state when a door or window has been opened during an unauthorized time, or in some other unauthorized conditions, have routinely been used as part of alarm systems. Intrusion of a door or window can be detected by a break in an electromagnetic circuit using a device, such as a reed switch, installed in one portion of the window or door and a magnet installed in an adjacent position in the other corresponding portion of the window or door. A typical retrofitted wireless window alarm kit comprises a sensor assembly mounted visibly on the door frame and an actuation element (typically a magnet) mounted on the window flush with the sensor assembly when the window is closed.

U.S. Pat. No. 7,081,816 discloses a wireless security sensor system with a wireless sensor assembly adapted to be retrofitted into a hollow interior of a window or door frame. An actuation unit in the form of a magnet assembly is inserted flush with the sensor into the hollow interior of the corresponding window or door. The sensor and magnet assemblies are hidden within the frame and window, respectively, and thereby not readily seen by an intruder. However, both the sensor assembly and the magnet assembly require 1 inch diameter bore holes in the door/window and in the corresponding frame. Also, a long wire antenna extends from the button shaped assembly housing.

U.S. Pat. No. 5,083,110 discloses a window alarm system with a plurality of small, self-contained thin, elongated units strategically located on a window. The units are either spring-controlled or transducer-controlled, and are set to activate an alarm upon the application of a predetermined amount of pressure thereto, e.g. when an intruder presses/touches one of the self-contained units. This type of alarm is not activated upon movement of a window/door.

SUMMARY OF THE INVENTION

One purpose of the present invention is to provide a wireless intrusion alarm kit that can be retrofitted non-invasively to existing building entrances, e.g. windows and doors, which is invisible to intruders and is not immediately visible to the occupants, i.e. a sensor assembly that is easy to install, preferably without requiring tools and impairing the design aesthetics of a home. One embodiment of the present disclosure has an elongated sensor assembly for detecting a change of state comprising at least one sensor switch configured to detect a given state and a change of state between the given state and at least one other state, a microprocessor configured to detect the change of state of said at least one sensor switch, an antenna system, a wireless transmitter configured to receive a signal from the microprocessor identifying a change of the state of the at least one sensor switch and transmit said signal by means of the antenna system, and a power source for providing electric power to the microprocessor, the at least one sensor switch, the antenna system and the wireless transmitter, wherein said at least one sensor switch, said microprocessor, said antenna system, said wireless transmitter, and said power source are incorporated in said elongated sensor assembly to reach a maximum height of the sensor assembly of less than 5 mm.

The abovementioned sensor assembly may be part of an alarm kit and/or a wireless alarm system. The wireless alarm system may comprise one or more of said elongated sensor assemblies, and a wireless receiver configured to receive and process signals transmitted from said one or more sensor assemblies. The alarm kit may comprise the abovementioned elongated sensor assembly and at least one actuation unit for actuating the sensor switch. The wireless alarm system comprising one or more of the abovementioned window alarm kits and a wireless receiver configured to receive and process signals transmitted from the sensor assemblies of said one or more window alarm kits.

For doors, casement windows and awning windows, the proofing and sealing surfaces function as an isolation barrier and are disposed between the closed door/window and the corresponding frame and are also typically in a plane parallel with the window plane. Many windows and doors therefore have narrow, elongated voids and cavities extending along the sides of the window and the corresponding frame. When the door/window is closed, these voids and cavities are formed behind or between the isolation barriers of the window. In some cases, these voids and cavities form part of the isolating capacities of the window, especially with double-glazed windows. However when the sash window is closed, it may have narrow elongated voids and cavities between the sash and the frame.

If a sensor assembly is built with a slim, elongated form factor, the sensor assembly for a wireless alarm system may be installed in these voids and cavities. Due to the slim, elongated form factor the sensor assembly may be placed there without modification to the window or frame, and may be hidden by the window frame and window when the window is in a closed position. This feature is advantageous as a user does not have to pierce the surfaces in windows and frames, which might cause decreased insulation properties, break the water seal provided by the manufacturers and may void the warranties of the windows. Doors, windows and frames may be partly manufactured in metal or plastics, e.g. with metals edgings, which makes it difficult to penetrate a metal surface to install a sensor assembly, e.g. as seen in U.S. Pat. No. 7,081,816. Piercing these surfaces, wherein some may have a vacuum below for insulation properties of the window/door precludes inserting anything therein and even a nail or screw piercing the surface must be avoided. In general it is highly undesirable for security device manufacturers and installers to void a manufacturer's warranty. Such risks reduce the likelihood of obtaining after-market, concealed, wireless alarm systems.

The present sensor assembly and alarm kit may be provided for sash doors, awning doors, casement doors, sash windows, awning windows or casement windows, in any type of material, such as wood, metal or plastics.

BRIEF DESCRIPTION OF DRAWINGS

FIG. 7c shows a cross-section across A1-A1 as shown in FIG. 7a;

FIG. 7d shows a cross-section across A2-A2 as shown in FIG. 7a;

FIG. 7e shows a cross-section across A3-A3 as shown in FIG. 7a;

DETAILED DESCRIPTION OF THE INVENTION

Figure 1:
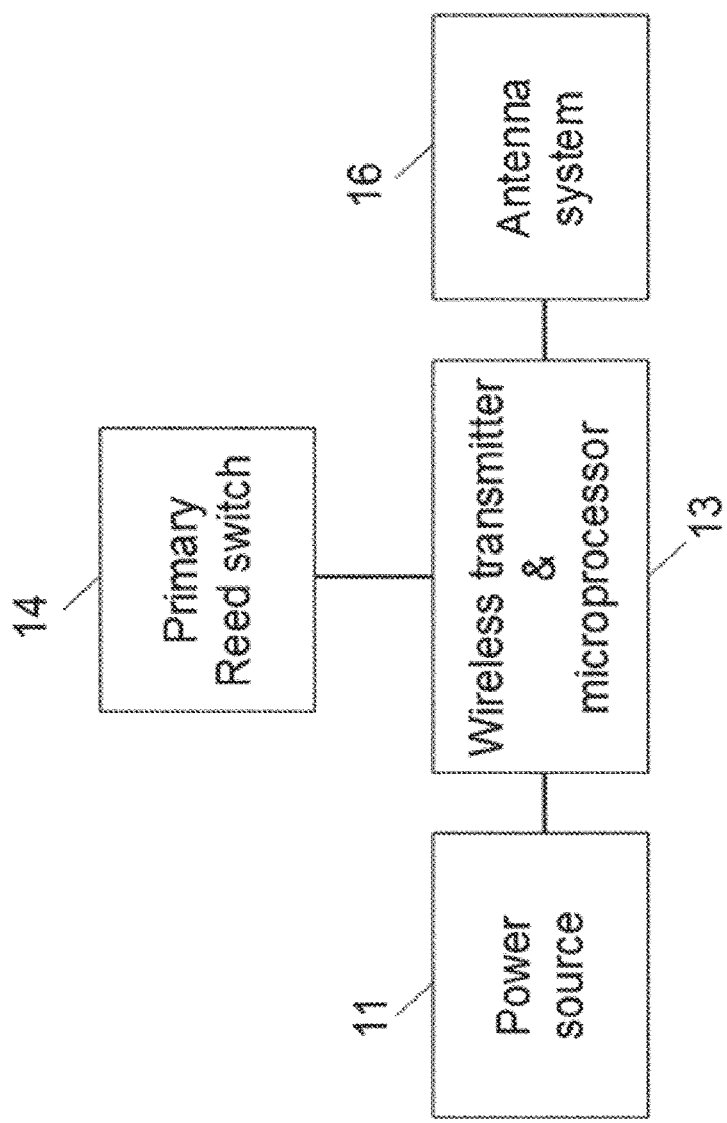
FIG. 1 shows a block diagram of an exemplary sensor assembly.

The presently disclosed sensor assembly is designed to be mounted in the voids and cavities formed between a door or window and the corresponding frame. In one embodiment of the present disclosure the elongated sensor assembly is therefore adapted to be mounted on a substantially plane surface.

The elongated sensor assembly may be mounted on a surface without penetrating the surface. The elongated sensor assembly may be mounted in an opening, void or cavity without modification of the opening, void or cavity, i.e. the physical size of the sensor assembly should not require modification to e.g. a window frame. This is especially advantageous for windows and doors with metallic parts. Furthermore, the sensor assembly does not require tools for mounting and/or installation of the assembly, thereby providing easy mounting and installation in an alarm system, thereby avoiding the use of expensive technicians. The present sensor assembly may be retrofitted (and removed without leaving traces or holes) to existing building entrances. However, in some cases it may be difficult to thoroughly fasten the sensor assembly without fastening means such as screws and nails. Thus, in a further embodiment of the invention the sensor assembly may be adapted to be mounted by means of nails or screws, preferably small screws or nails, such as pegs or pins.

Thus, in another embodiment of the present disclosure the elongated sensor assembly may be mounted on a window or window frame such that the elongated sensor assembly is located in a void formed between the window and the window frame when the window is closed. Further, the elongated sensor assembly may be mounted on a door or door frame such that the elongated sensor assembly is located in a void formed between the door and the door frame when the door is closed.

In order to fit inside these narrow elongated voids and cavities the maximum height/thickness of the sensor assembly may be kept to a minimum, i.e. preferably less than 5 mm, more preferably less than 4.5 mm, yet more preferably less than 4 mm, or less than 3.5 mm, even more preferably less than 3 mm, yet more preferably less than 2.5 mm, even more preferably less than 2 mm, possibly less than 1.5 mm or less than 1 mm.

The power source, typically in the form of a battery, is among the largest components of the sensor assembly. To reduce the height of the sensor assembly the battery may be placed besides the circuit structure, e.g. in the form of a PCB, instead of stacking it on top of the PCB. Ultrathin batteries with thickness below 0.5 mm are presently commercially available. If the sensor assembly is laminated or molded in plastic it will not add to the height. If using a container housing ultrathin thin top and bottom walls may be provided, such as stickers as top and bottom wall. The top and/or bottom sticker could then include an adhesive for mounting the sensor in the window/door. In one embodiment, the PCB or a circuit structure may form a lid of a container of the sensor assembly. As a consequence, in this embodiment the power source is placed between the PCB (or circuit structure) and the container.

The PCB with components may be height optimized by using an ultrathin PCB or a flexible circuit structure thereby achieving a circuit structure of less than 0.1 mm. Reed switches are presently commercially available down to a height of 1.27 mm (an SMD Reed switch). A pin-mounted Reed switch may be used and it may be mounted in a recess or hole in the PCB. An IC is typically on the order of 1 mm.

If the following commercially available components are used i.e. Plastic container+adhesive: 0.25 mm, PCB: 0.2 mm, sensor switch: 1.27 mm and a margin: 0.1 mm adds to a total height of 1.82 mm. This may allow for a battery height of approx. 1.5 mm, i.e. a height of the sensor assembly of less than 2 mm is practically realizable if using currently commercially available components. Even thinner components may be provided in the future allowing for even thinner sensor assemblies, i.e. below 1.5 mm, or down to 1 mm. However, even with a height of approx. 2, 3, 4 or 5 mm the present sensor assembly fits into the void and cavities of existing windows and doors. However, thinner sensor assemblies probably fit into more windows and doors.

In one embodiment of the present disclosure at least one sensor switch may be configured to detect whether a window or door is open or closed. Open/closed in this context is mutually exclusive, meaning that the window or door is to be considered either open or closed. A number of sensor switches are capable of detecting whether a door/window is open or closed e.g. magnetically activated sensors, magnetoresistive sensors, or proximity sensors.

In a further embodiment of the present disclosure at least one sensor switch may be configured to detect a change of position of an object. The object may be e.g. a part of a building entrance or an object related to a building entrance. Detecting the change of position of an object can be regarded as motion detection. Detecting motion can be done directly with a motion sensor but also indirectly by means of e.g. an accelerometer or vibration sensor. One advantage of detecting the motion of an object such as a door or window compared to detecting whether the door/window is open or closed is that detecting motion does not require fixed reference points. As an example, this makes it possible to use an alarm system for a window that is not completely closed, basically in any position. If the window moves, the alarm may be triggered. An additional advantage is an actuation unit may not be necessary when using e.g. a vibration sensor, which further simplifies the installation. In one embodiment of the present disclosure at least one sensor switch may be configured to detect if a door or window is moved.

In a further embodiment of the present disclosure at least one sensor switch may be configured to detect a change of temperature. A sudden change of temperature, preferably placed adjacent to a building entrance, could be used to indicate that e.g. a door or window has been opened. Similarly, a sensor switch configured to detect a change of light could be used to indicate that e.g. a door or window has been opened if the sensor switch is placed in a void or cavity where there is no light. A sensor switch configured to detect a change of light also has the advantage that it may be capable of detecting other activities than just a door/window being opened/closed. An example is detection of an object approaching a building or indirect triggering through e.g. another independent motion sensor system that turns on lights based on motions.

In one embodiment of the invention at least one sensor switch is magnetically activated. This is the case with e.g. a Reed switch. The sensor assembly is preferably configured such that when the face of the sensor assembly containing the sensor switch is adjacent, aligned or flush with an actuation unit, e.g. a magnet, the sensor switch of the sensor assembly closes in the presence of the magnetic field between the sensor switch and the magnet, e.g. when the window is closed. The microprocessor monitors the state of the sensor switch. When the window is in the open position, e.g. due to an intruder, the magnetic field is removed, and the sensor switch opens, which in turn sends a signal to the wireless transmitter. The sensor switch in this embodiment may also use the opposite switching conditions i.e. the sensor switch of the sensor assembly opens in the presence of the magnetic field between the sensor switch and the magnet. The sensor switch in this embodiment may also be bistable, meaning it stays switched even after removal of the permanent magnet. The wireless transmitter may, in turn, transmit a signal which can be received by a receiving panel of an alarm system which may be configured to emit an alarm signal to indicate that the window has been opened.

The sensor assembly may further comprise means for connecting the components of the sensor assembly, e.g. for connecting the sensor switch, the microprocessor, the wireless transmitter and the power source, e.g. in the form a circuit structure, such as a PCB or a flexible circuit structure. The circuit structure may be rigid, semi-flexible or flexible. As a consequence, the sensor assembly may be at least partly flexible.

In one embodiment the antenna system comprises at least one antenna, such as a wire antenna. A matching network, also known as impedance matching network, may be provided in the antenna system. An impedance matching network is typically used to ensure that the wireless transmitter sees a fifty ohm antenna, thus the matching network basically transforms a wire antenna impedance to fifty ohm at the target frequency band. The impedance matching network may comprise inductors and capacitors.

In order to save power usage of the sensor assembly, the microprocessor may be configured to revert from an active mode to an idle mode, when not in use. Similarly, the microprocessor may be configured to revert from an idle mode to an active mode when detecting a change of state of a sensor switch. A similar functionality is described in U.S. Pat. No. 7,081,816 wherein a microprocessor is disclosed that is able to sample the state of a switch at select intervals and revert to an idle mode, i.e. the microprocessor samples the state of the switch, as opposed to continuous monitoring, in order to conserve the battery power. During the idle periods, the power drawn by the battery is negligible. Thus, battery life is extended several times over the anticipated life of the battery during continuous monitoring. In another embodiment, at least one (electrical) circuit configured to detect a change of state of a sensor switch, and wherein the circuit is connected between at least one sensor switch and the microprocessor. A change of electrical levels from the circuit when a sensor changes state, will trigger the CPU to move from a sleep/idle state to an active state. In that case the microprocessor does not sample the sensor switch at select intervals.

To further reduce power usage of the sensor assembly, at least one first power switch may be provided, that is configured to disconnect the power source from at least one sensor switch when the at least sensor switch is not in use.

Instead of changing the battery, the battery life may be extended by charging it by an external power source. Thus, the sensor assembly may be adapted for connection to an external power source for charging its internal power source. Thus, the sensor assembly may further comprise a second power switch and charging circuitry, and wherein the sensor assembly may be configured such that an external power source can charge the power source of the sensor assembly. The external power source may e.g. be a wired charger, a solar powered source, e.g. a solar cell, or a battery.

A sensor switch may be one of the thickest components of the sensor assembly. The sensor switch may therefore be located in a recess or dint in the circuit structure to minimize the height of the sensor assembly.

The antenna may be a wire, a chip or a printed circuit board antenna. There may be more than one antenna. In case of usage of the common free ISM bands, e.g. 433 and 868 MHz, for wireless transmission the antenna may be a wire antenna with a length of approx. 9 cm (868 MHz). For the 433 MHz band, the antenna may be as long as 18 cm. However, as the sensor assembly is elongated the antenna may be arranged to extend along the longitudinal direction of the elongated sensor assembly.

The sensor assembly may also be mounted in places that are exposed to outside weather conditions such as rain, dirt, moist, wind, heat and cold. The sensor assembly may therefore be moisture protected. For example, the sensor assembly may be laminated, or moulded in a polymer material, such that all the components are provided in a sealed package.

In yet another embodiment of the sensor assembly, a container may be provided for housing the components of the assembly. Thus, the form factor of the sensor assembly is determined by the container housing. The container may be provided to protect the components of the sensor assembly. The container may be moisture protected and/or sealed. For example, the container may be provided as an open elongated thin box and a lid with gaskets, or a lid (or bottom) possibly in the form of a sticker. The abovementioned circuit structure or PCB may form a lid of the container. Thus a thinner design can be achieved since the PCB/circuit structure replaces one side of the housing. Moreover, the circuit can easily be detached for repair or replacement. The lid may seal the container. To ensure easy installation of the sensor assembly at least a part of one side, e.g. the bottom side, of the elongated sensor assembly may have adhesive or provided with an adhesive, e.g. an adhesive sticker. Thereby the sensor assembly may be attached to a window or frame within seconds.

In another embodiment, the wireless transmitter may be configured for encrypted transmission of signals. Encryption may be provided to prevent unwanted interception of the signals and to prevent a third party to take control of the transmission between transmitter and receiver.

The sensor assembly may be provided with additional sensors and/or sensor options. For example, the sensor assembly may further comprise a light sensor configured to detect the level and/or a change of the ambient light conditions. A signal may be transmitted if nearby light is turned on or off. The sensor assembly may further comprise a temperature sensor configured to detect the level and/or a change in the ambient temperature. A signal may be transmitted if the temperature near the window changes, e.g. due to a broken window.

The sensor assembly may further comprise a humidity sensor configured to detect the level or a change in the ambient humidity. A signal may be transmitted if ventilation is necessary. The sensor assembly may further comprise a water sensor configured to detect the presence of water on the surface of the sensor assembly. A signal may be transmitted if a window is leaky or permeable. If the sensor assembly is mounted on top of the window blade it will be able to detect rain on an open window if provided with a water/rain sensor.

An additional sensor switch may be included in the sensor assembly to detect if someone tries to tamper with the sensor assembly. This second sensor switch may not be configured to detect the "normal" actuation unit when the window is closed, but may be placed in the sensor assembly to be configured to detect a foreign magnet adjacent to the sensor assembly and consequently transmit an alarm signal.

The sensor assembly may further comprise a motion sensor configured to detect movement adjacent to the sensor assembly. This feature of an alarm system allows detecting unlawful entrants. The sensor assembly may further comprise at least one accelerometer or vibration sensor configured to detect movement of the sensor assembly. In case someone tries to disable or move the sensor assembly.

The form factor of the sensor assembly may be critical for the ability to mount the assembly in the abovementioned voids and cavities. Thus, in a further embodiment of the invention, the maximum width of the sensor assembly is less than 40 mm, or less than 35 mm, or less than 30 mm, or less than 28 mm, or less than 26 mm, or less than 24 mm, or less than 22 mm, or less than 20 mm, or less than 18 mm, or less than 16 mm.

In order to reduce the height of the sensor assembly the power source (i.e. the internal power source) is preferably a battery with a thickness of less than or equal to 3 mm, 2.5 mm, 2 mm, 1.8 mm, 1.6 mm, 1.4 mm, 1.2 mm, 1 mm, 0.8 mm, 0.7 mm, 0.6 mm, 0.5 mm, or less than or equal to 0.4 mm. Lithium coin cell or button cell batteries may be used, a common variety being the 3 volt manganese variety, typically 20 mm in diameter and 1.6-3 mm thick. However, ultra-thin batteries are commercially available with a thickness of only 0.45 mm, which have an increased width compared to the coin cell batteries. However, they are commonly available with a width below 25 mm.

The present disclosure also relates to an alarm kit comprising the elongated sensor assembly as herein described and at least one actuation unit for actuating at least one sensor switch. At least one actuation unit preferably comprises a magnet, e.g. in the case of a reed switch. The actuation unit may be provided with an adhesive surface. In one embodiment the actuation unit may consist of a magnet or a magnet with an adhesive surface in order for easy mounting abilities. Thus, the actuation unit may simply be a piece of magnetic tape.

The actuation unit may also be installed in the abovementioned voids and cavities formed in windows and doors. Thus, a reduced height of the actuation unit may be preferred. Thus, in one embodiment the maximum height of the actuation unit may be less than 3 mm, or less than 2.5 mm, or less than 2 mm, or less than 1.5 mm, or less than 1 mm, or less than 0.8, or less than 0.6 mm, or less than 0.5 mm, or less than 0.4 mm, or less than 0.3 mm, or less than 0.2 mm, or less than 0.1 mm.

The presently disclosed sensor assembly is designed to be mounted in the voids and cavities formed between a door or window and the corresponding frame. Similarly, the alarm kit may be designed to be mounted in the voids and cavities formed between a door or window and the corresponding frame.

The alarm kit may be adapted to be mounted in an opening, void or cavity without modification of the opening, void or cavity, i.e. the physical size of the alarm kit may not require modification to e.g. a window frame. Furthermore, the alarm kit may not require tools for mounting and/or installation of the kit, thereby providing easy mounting and installation in an alarm system, and consequently avoiding the use of expensive technicians. The alarm kit may therefore be retrofitted (and removed without leaving traces or holes) to existing building entrances.

Thus, in another embodiment, the alarm kit may be adapted to be mounted on a window or window frame such that the alarm kit is located in a void formed between the window and the window frame when the window is closed. Further, the alarm kit may be adapted to be mounted on a door or door frame such that the alarm kit is located in a void formed between the door and the door frame when the door is closed. The sensor assembly may be mounted on the door/window and the actuation unit may consequently be mounted on the corresponding frame, or vice versa, i.e. the sensor assembly on the frame and the actuation unit on the window/door.

An additional actuation unit may be included in the alarm kit wherein the sensor assembly is configured to detect three different positions of the window: Open, closed and a third position where the window is slightly open for airing but still locked to prevent unlawful entry, thereby having a three state sensor assembly. Such a three state sensor assembly may e.g. be placed along the side of an awning window, where the window and frame are separated at the bottom of the window, and still adjacent further up, i.e. in position B in FIG. 6. Such sensor could e.g. comprise two Reed sensor switches and it may require one or two magnets for actuation. Reed switch #1 could e.g. be placed so it senses a magnet when the window is closed, but not in airing or open positions. Reed switch #1 could preferably be placed at the lower end of the window. Reed switch #2 could e.g. be placed in such a way that it senses the magnet in airing position, but not in open position. In order to sense the magnet in airing position, the switch/magnet could e.g. be placed further up on the window where the frame and window are still adjacent. The reed switch may or may not sense a magnet also in the closed position.

The height of the voids and cavities used for installation may be very limited and the sensor assembly, the actuation unit and/or the alarm may therefore be configured such that the sensor assembly and the actuation unit shall be located slightly laterally displaced relative to each other in a window or door system when the corresponding window or door is closed, i.e. the sensor assembly and the actuation unit is mounted slightly offset. I.e. they are still located adjacent to each other, but the actuation unit is possibly not located directly "on top" or "below" the sensor assembly in the void. Thus the actuation unit may then not add to the total height of the alarm kit.

In one embodiment, the thickness of a section of the elongated sensor assembly is less than 3 mm, or less than 2.5 mm, or less than 2 mm, or less than 1.5 mm, or less than 1 mm. In this embodiment, the section is thinner than other parts of the assembly. The advantage of having a thinner sector is that it can be used for sliding in an actuation unit (typically a magnet) for e.g. a reed sensor without increasing the total thickness of the sensor assembly and actuation unit. An example of this configuration is shown in FIG. 7b. The magnet 71 is not part of the sensor assembly, but may be placed opposite to the thinner section, with the possibility to slide it into the section to fit into the sensor assembly without making the total thickness larger. In one embodiment, the width of the section is at least 3 mm, or at least 3.5 mm, or at least 4.0 mm, or at least 4.5 mm, or at least 5.0 mm, or at least 5.5 mm, or at least 6.0 mm.

The present disclosure also relates to a wireless alarm system comprising one or more of the herein described elongated sensor assemblies and a wireless receiver configured to receive and process signals transmitted from the one or more sensor assemblies. The alarm system may further comprise a roll of magnetic tape, wherein a piece of the magnetic tape is suitable for actuating the sensor switch of the elongated sensor assemblies.

The present disclosure also relates to a wireless alarm system comprising one or more of the above described window alarm kits and a wireless receiver configured to receive and process signals transmitted from the sensor assemblies of the one or more window alarm kits.

Capacitive Areas, Tampering Functionality, Moisture Sensing Functionality, Auto-Inclusion The present disclosure further relates to an elongated sensor assembly for detecting a change of state comprising:
- at least one sensor switch configured to detect a given state and a change of state between the given state and at least one other state;
- a microprocessor configured to detect the change of state of the at least one sensor switch;
- an antenna system;
- a wireless transceiver configured to receive a signal from the microprocessor identifying the change of state of the at least one sensor switch and transmit the signal by the antenna system; and
- a power source for providing electric power to the microprocessor, the at least one sensor switch, and the wireless transceiver;
- wherein a bottom side of the sensor assembly comprises a ground plane and at least a first capacitive area in connection with a capacitive sensor, wherein the microprocessor is further configured to detect a change of capacitive level of the capacitive sensor in response to an externally generated change in conductivity between the ground plane and the capacitive area(s) capacitive area.

Figure 9A:
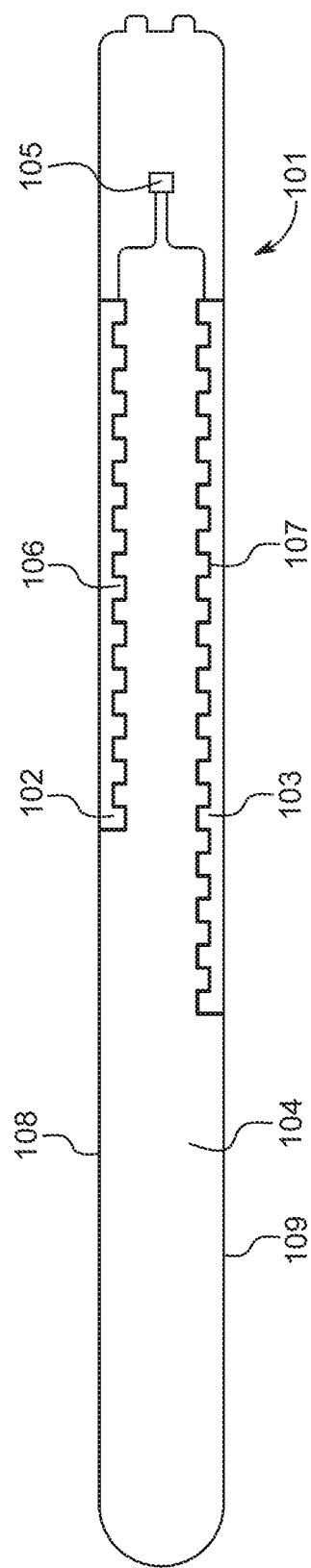
FIGS. 9a and 9b show an embodiment of an elongated sensor assembly with double capacitive areas on the bottom side, a ground plane and a capacitive sensor.

The capacitive area may be useful for several applications. FIG. 9A shows an embodiment of an elongated sensor assembly with double capacitive areas on the bottom side, a ground plane and a capacitive sensor. The assembly may have a first and a second capacitive area. The at least first capacitive area may be separated from the ground plane by a first isolation layer, preferably wherein the first isolation layer is integrated in the bottom side of the sensor assembly, and/or wherein the second capacitive area is separated from the ground plane by a second isolation layer, as shown in FIG. 9A. The presently disclosed elongated sensor assembly may be useful in a window and door alarm system as an anti-tampering sensor switch. In particular, if used together with an additional element, such as an electrically element placed in proximity to the capacitive areas, the sensor could signal tampering in the scenario when the assembly is removed from the place where it is mounted. This would provide additional protection in for example the case where an intruder manipulates a possible magnetic switch by an external magnet by holding it close to the magnetic switch and remove the whole assembly. A further application, as explained in detail below, is to arrange moisture absorbing element(s) to cover at least a part of the ground plane and at least of the capacitive area(s) in a mounted position. This may provide a very thin sensor assembly for e.g. water leak detection.

The capacitive area(s) may be made of any material suitable for capacitive sensing, for example copper. Copper areas may be implemented on the printed circuit board for this purpose. The capacitive sensor may be a capacitance-to-digital sensor, sensor circuit or sensor subsystem. The capacitive sensor may be any type of suitable sensor for measuring capacitance on input from the capacitive area(s). The capacitive sensor may be configured to measure a capacitance (C) by measuring a period of time for charging or discharging, or by comparing a level of charge after a time period. The capacitive sensor may be configured to measure the capacitance between one of the capacitive areas and the ground plane, or between any of the capacitive areas and the ground plane. The capacitive sensor or capacitive sensor subsystem may use a capacitance-to-digital circuit to determine the capacitance on a port pin. The module can take measurements from different port pins using an analog multiplexer. The sensor may have a low-power shutdown configuration. The capacitive sensor may be configured to take measurements on one port pin or a group of port pins, using auto-scan. A selectable gain circuit may be used to adjust the maximum allowable capacitance. The capacitive sensor may have one or two sensor inputs. If more than one capacitive area is used, each capacitive area can either be connected to a separate capacitive sensor input or to the same capacitive sensor input.

In one embodiment the isolation layer between the capacitive area and ground plane are square wave shaped as shown in FIG. 9A, alternatively triangular, or substantially finger-shaped. One advantage of these shapes is that when used with the elongated shape of the assembly, elongated pieces of for example moisture absorbing material may be placed over a number of the square shapes, which means that if only very little moisture is absorbed by a small section of the moisture absorbing element, there is still a good chance that it will come in contact with both the capacitive area and the ground plane.

Several, for example two, capacitive areas may be arranged as shown in FIG. 9A, i.e. a configuration wherein a first capacitive area abuts a first edge of the elongated sensor assembly, preferably a first of the longer edges of the elongated sensor assembly, and a second capacitive area abuts a second edge of the elongated sensor assembly, preferably a second of the longer edges of the elongated sensor assembly, opposite of the first of the longer edges. The capacitive areas may have different lengths and may also be overlapping in the longitudinal direction of the sensor assembly. A printed circuit board may form the bottom side of the sensor assembly. The ground plane, the first capacitive area, optionally the second capacitive area, optionally the first and/or second isolation layer may be part of a PCB, wherein the PCB constitutes the bottom side of the elongated sensor assembly.

Preferably, the elongated sensor assembly is thin, or ultrathin, wherein the at least one sensor switch, the microprocessor, the antenna system, the wireless transceiver, and the power source are incorporated in the elongated sensor assembly, wherein said assembly has a maximum height of less than 5 mm. The elongated sensor assembly may have a length of at least 100 mm, preferably at least 150 mm, more preferably at least 200 mm. In one embodiment the elongated sensor assembly has a width of 10-30 mm.

The present disclosure further relates to a wireless alarm system or kit comprising the elongated sensor assembly having at least a first capacitive area, as described above, the wireless alarm system/kit further comprising a conductive element, preferably in the form of a conducting tape, such as a metallic tape. Preferably, the conductive element is dimensioned to fit at least a part of the first and/or second capacitive area(s) and at least a part of the ground plane. The conductive element may also be dimensioned to fit both a part of the first capacitive area and a part of the second capacitive area, and at least a part of the ground plane of the elongated sensor assembly. The microcontroller may be configured to transmit a tamper indication if the elongated sensor assembly is removed from the conductive tape.

In one tampering scenario an intruder may try to remove the elongated assembly from the position where it is mounted. In this scenario, if there for example is a first magnetic sensor, the intruder may use an external magnet to manipulate the sensor signal to indicate that the elongated sensor assembly has not been removed. The inventors have realized that by using the capacitive area(s), in addition to a magnetic anti-tampering mechanism, or alone, an improved protection can be achieved in this regard. In particular, if the conductive element has an adhesive layer on both sides, and one side is more adhesive than the other, i.e. it requires a stronger force to remove the conductive element from the first side than from the second side, a solution which is difficult for an intruder to tamper can be obtained. If the more adhesive side is attached to for example a window frame, and the less adhesive side is attached to the sensor assembly at the capacitive area(s), if an intruder pulls the elongated sensor assembly, he will remove the sensor assembly but not the conductive tape. This will cause a change of capacitive level observed by the capacitive sensor, which will indicate an intrusion in the system.

Preferably, the alarm kit is delivered with a package comprising the elongated sensor assembly having at least a first capacitive area and a piece of conductive tape adhesive on both sides. The conductive tape may have a removable film on the second side, intended to be attached to an object, and possibly also on the first side, intended to be attached to the sensor assembly. A precise placement of the conductive tape may be important for proper functioning of the capacitive area(s) and conductive element to trigger a switch in the capacitive sensor. The inventors have realized that this can be achieved by incorporating the conductive part in an adhesive sheet, which has a contour matching the contour of the elongated sensor assembly. The conductive tape may constitute a section of the adhesive sheet, as shown in FIG. 11C. The conductive tape may be arranged in the adhesive sheet such that conductive tape fits the first and/or second capacitive areas when the adhesive sheet is attached to the elongated sensor assembly such that the contours coincide.

The elongated sensor assembly or wireless alarm system may be delivered in a deep sleep configuration. The elongated sensor may further comprise at least one actuation unit for actuating the sensor switch. The at least one actuation unit may comprise a magnet or a metal foil. The assembly may be delivered in a deep sleep mode, wherein the magnet or metal foil is arranged in proximity, such as attached to, the first and/or second capacitive areas, and the elongated sensor assembly is configured in a deep sleep mode. Deep sleep may be defined as a state wherein the ultrathin elongated sensor assembly is not included in the wireless system and wherein the sensor assembly functionality is decreased to a minimum in order to preserve battery while still being able to react to a user initiative to add or include the sensor assembly to a system. This mode may also be an auto-add/auto-include mode. In this mode the actuation unit may be placed adjacent to the capacitive area(s). Preferably, the system is configured in a state wherein a minimum of power is consumed in deep sleep mode. When the actuation unit is removed from the assembly, the microprocessor may be woken up, and the sensor assembly may be included in a system, which may include a central control device. In deep sleep mode the current consumption of the assembly may be less than 500 nA, or less than 400 nA, or less than 300 nA or less than 200 nA, or less than 100 nA. The microprocessor may be configured to auto-include the elongated sensor assembly in a system when the magnet or metal foil is removed from the first and/or second capacitive areas.

The present disclosure further relates to an elongated moisture sensor assembly kit comprising the elongated sensor assembly in any embodiment described above and at least one moisture absorbing element. Preferably, the at least one moisture absorbing element is/are dimensioned to fit the first and/or second capacitive area(s) and at least a part of the ground plane. FIG. 10C shows a mounting element comprising two moisture absorbing elements in the form of sponge sections. The moisture absorbing elements may be made of any material for absorbing moisture including sponge materials and porous materials. The elongated moisture sensor assembly kit may further comprise a mounting element, which preferably has a contour matching the contour of the elongated sensor assembly. The matching contour and a fixed location of the moisture absorbing elements in/on the mounting element may ensure that the moisture absorbing element(s) is/are correctly positioned over the capacitive area(s) in a mounted configuration. Preferably, the moisture absorbing element(s) is/are incorporated in the mounting element, wherein the absorbing element(s) is/are located to fit the first and/or second capacitive areas in a mounted configuration. The mounting element may be a thin plate, made of for example plastic. The mounting element may be thinner than 7 mm, preferably less than 5 mm, more preferably less than 3 mm. The mounting element may have screw holes for mounting said mounting element to an object. The mounting element may also have a first adhesive surface for attaching said mounting element to the elongated sensor assembly, and/or a second adhesive surface for attaching said mounting element to an object.

DETAILED DESCRIPTION OF DRAWINGS

FIG. 1 shows the most basic components of an exemplary sensor assembly with the power source 11 connected to the microprocessor and wireless transmitter incorporated in a single chip 12. The integrated chip (IC) 13 connects to a Reed switch 14 and an antenna system 16. The IC may comprise RF transmitter, microprocessor, memory and clock. The IC may be provided with a plurality of GPIO's, such as 8 GPIO's, in order to be able to connect additional switches and sensors.

Figure 2:
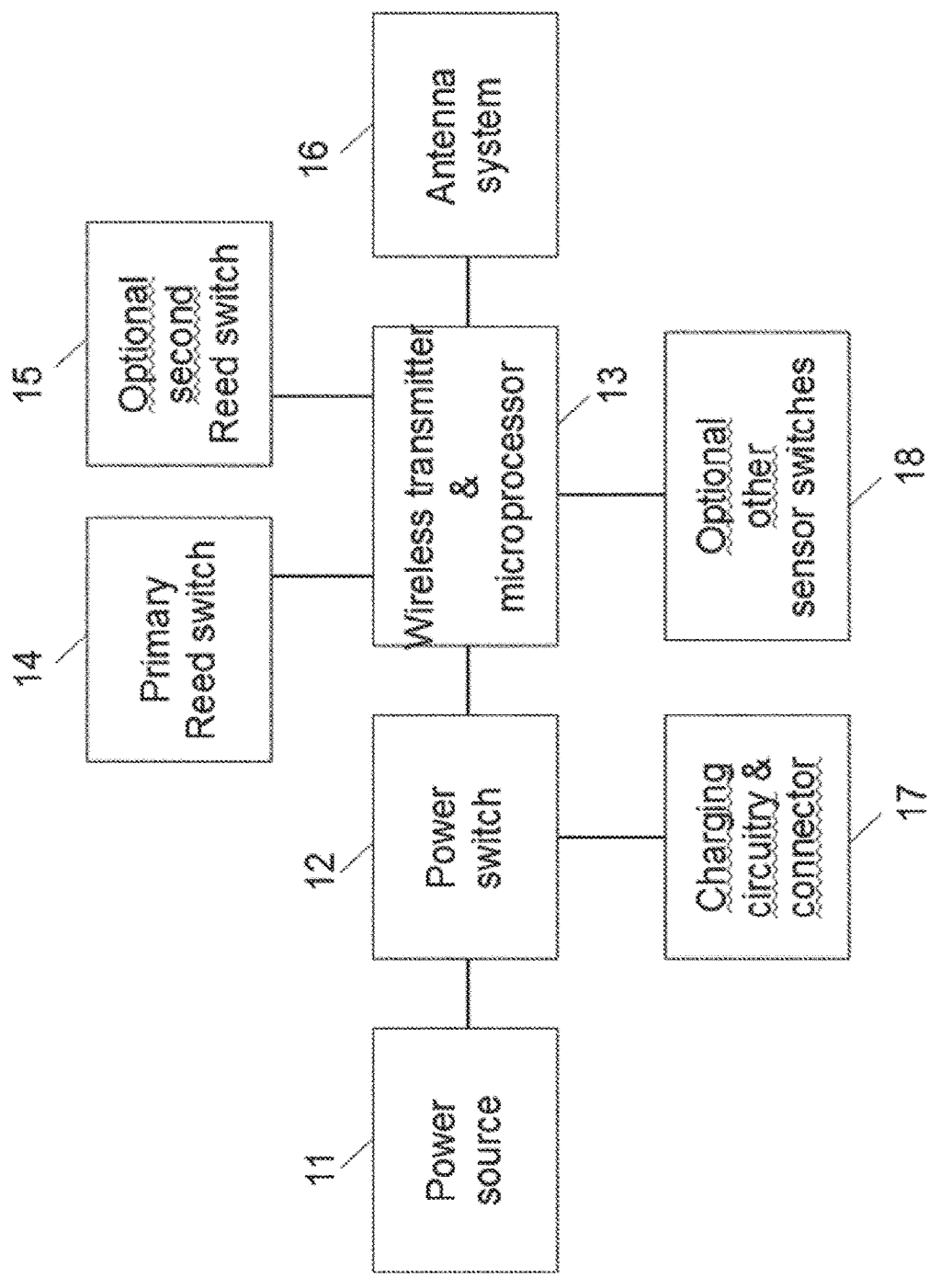
FIG. 2 shows another a block diagram of an exemplary sensor assembly with various optional features.

FIG. 2 shows the exemplary sensor assembly from FIG. 1 with additional optional features. A power switch 12 with charging circuitry and processor 17 is inserted between the power source 11 and the chip 13 to provide for possible charging of the power source. An additional Reed switch 15 is provided in parallel to the primary Reed switch 14 in order to detect other state changes, i.e. additional positions of a door/window. Any additional sensor switches 18 (temperature, acceleration, movement, humidity, etc.) may be connected to the chip 18.

Figure 3:
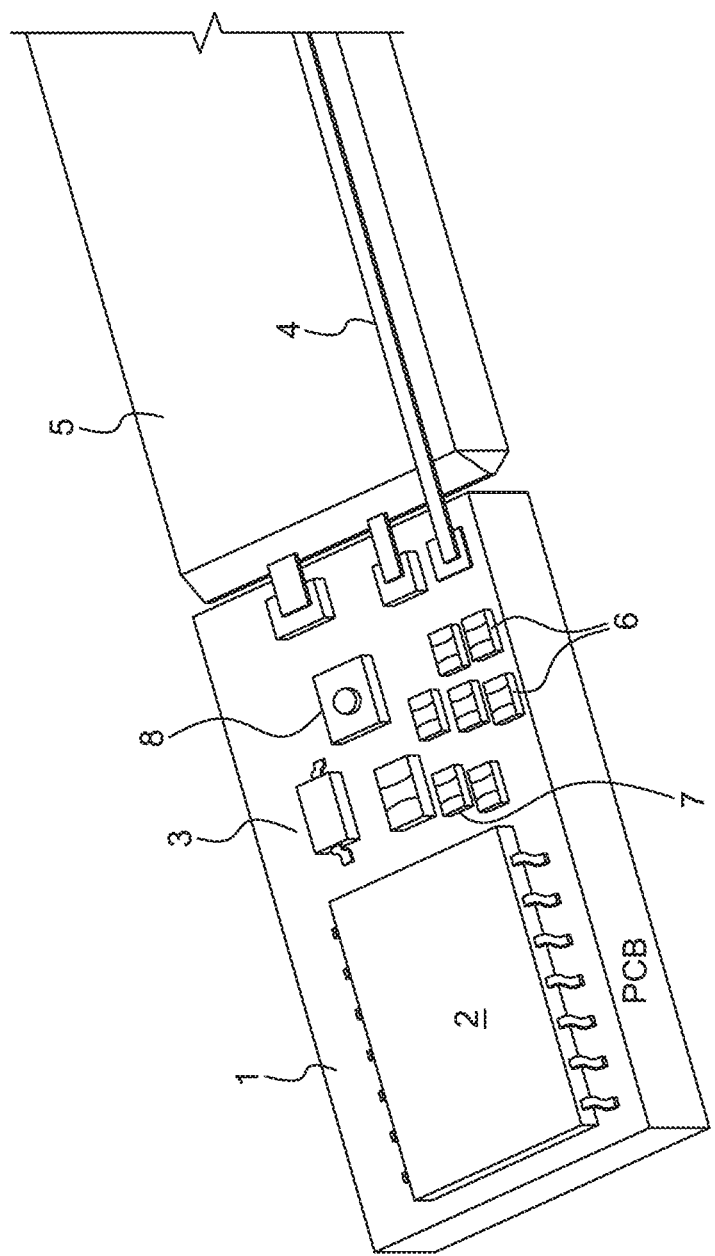
FIG. 3 is a perspective view of an exemplary sensor assembly with a thin elongated form factor.

FIG. 3 is an exemplary illustration of how to incorporate the components of an exemplary sensor assembly to a thin elongated form factor. A thin PCB holds the chip 2 (microprocessor+transmitter), Reed switch 3, antenna matching network 6, decoupling components 7 and power switch 8. Next to the PCB the battery 5 is provided as an extension and the antenna is extending in the longitudinal direction of the sensor assembly. Thus, the sensor assembly may be realized to have a thin and elongated form factor.

Figure 4A:
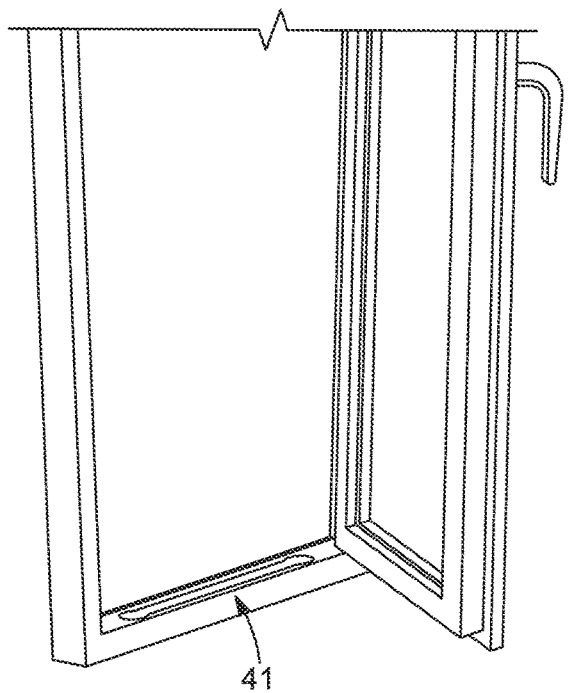
FIG. 4a shows a casement window that is open and with an exemplary slim and elongated sensor assembly installed on the bottom of the inside surface of the window frame.
Figure 4B:
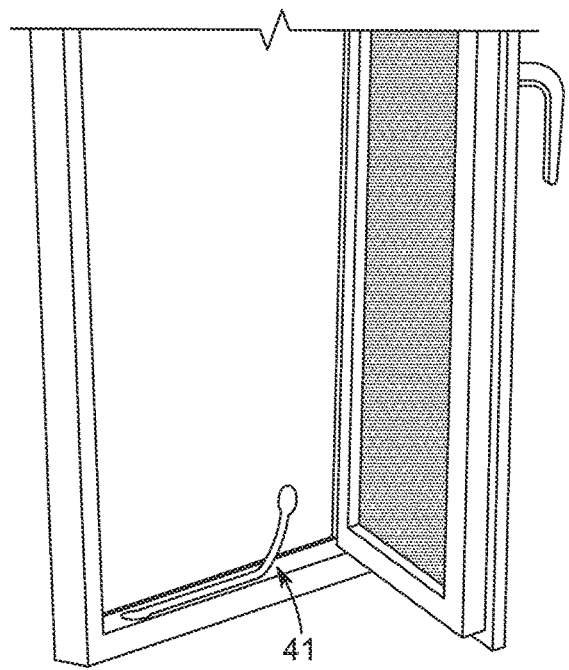
FIG. 4b illustrates the slimness and flexibility of the sensor assembly of FIG. 1.

FIG. 4a shows a casement window that is open and with an exemplary slim and elongated sensor assembly 41 as described herein installed on the bottom of the inside surface of the window frame. FIG. 4b illustrates the slimness and possible flexibility of the sensor assembly 41 of FIG. 1.

Figure 4C:
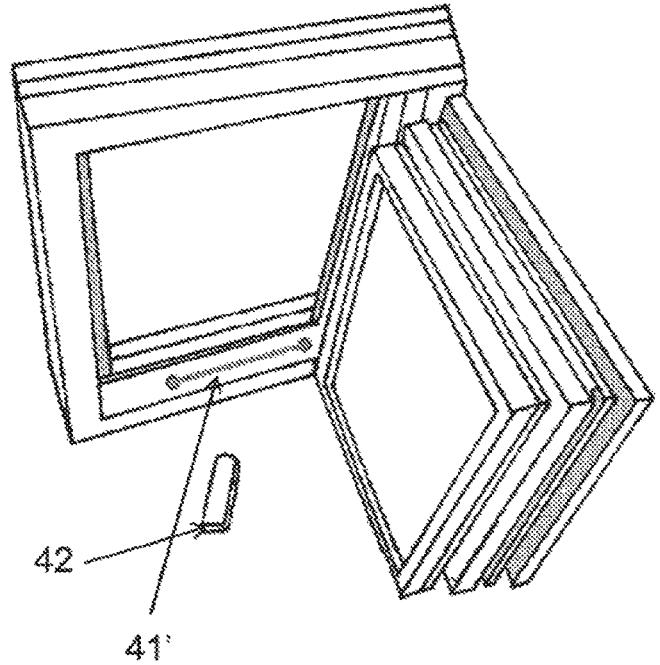
FIG. 4c is a perspective view of a mock-up of another slim elongated sensor assembly installed in the bottom of the inside surface of a casement frame and a prior art sensor assembly is lying in front of the casement window for comparison.

FIG. 4c is a photo of a mock-up of another slim elongated sensor assembly 41 installed in the bottom of the inside surface of a casement frame. A commercially available prior art wireless sensor assembly is lying in front of the casement window for comparison. This prior art sensor assembly is to be mounted directly on the window frame with a magnet on the window flush with the assembly. As seen from FIG. 4c this bulk assembly is not aesthetically appealing, and when installed on a window frame it will often be visible from the outside, i.e. unlawful entrants will be able to see the sensor assembly. The sensor assembly as herein disclosed will not be visible to occupiers as well as burglars.

Figure 4D:
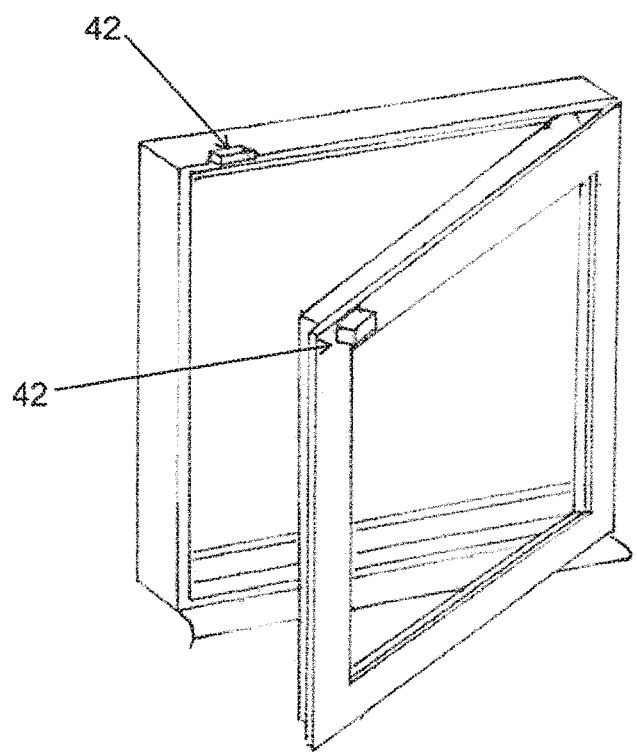
FIG. 4d shows a prior art window alarm installed on the outside of a casement frame and a magnet for actuating the window alarm on the outside of a window frame.

FIG. 4d shows an example of a prior art window alarm installed on the outside of a casement frame and the magnet placed on the outside of a window frame. In this example both parts of the retrofitted window alarm are mounted visibly.

Figure 5A:
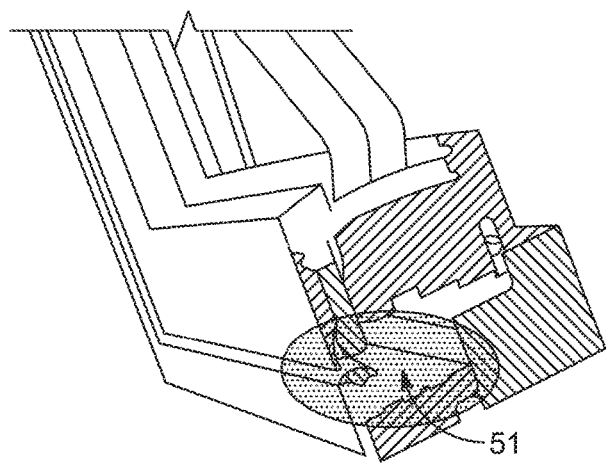
FIG. 5a is a cut-out illustration of a closed triple glazed casement window.
Figure 5B:
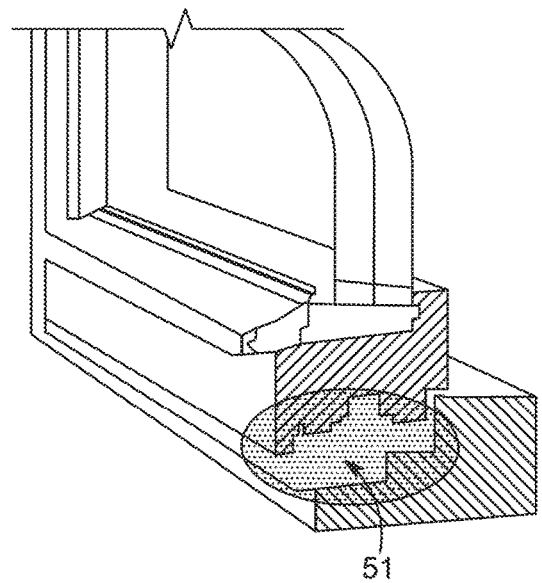
FIG. 5b is a cut-out illustration of another closed triple glazed casement window.
Figure 5C:
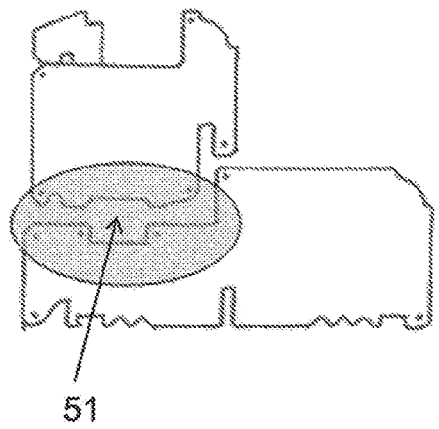
FIG. 5c is a side-view cut-out illustration of a casement window in closed position.

FIGS. 5a and 5b are cut-out illustrations of closed triple glazed casement windows. The cross-section of the elongated void/cavity 51 formed between the window and the frame is highlighted with an ellipse. FIG. 5c is a technical drawing showing a side-view cut-out illustration of a casement window in a closed position. The void/cavity 51 is also clearly visible in FIG. 5c. The presently disclosed elongated sensor assembly and alarm kit is preferably adapted and designed to be mounted in such a void/cavity 51.

Figure 6:
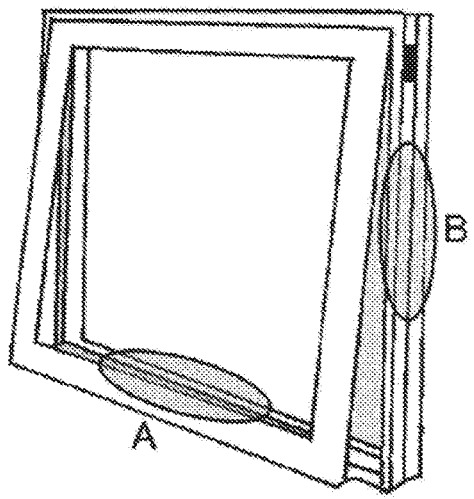
FIG. 6 illustrates an awning window with exemplary mounting locations "A" and "B"

FIG. 6 illustrates an awning window with indications of exemplary mounting locations A and B of the presently disclosed alarm kit.

Figure 7A:
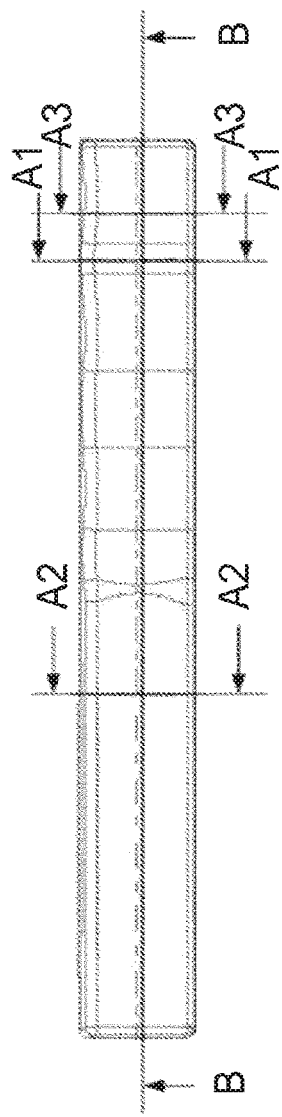
FIG. 7a shows a top view of an embodiment of the sensor assembly.
Figure 7B:
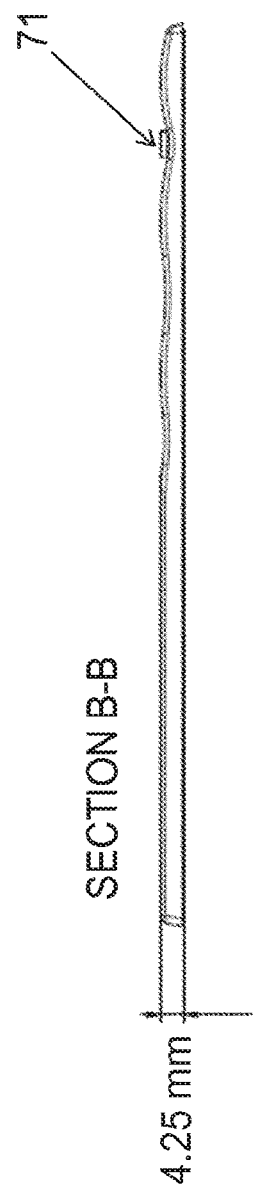
FIG. 7b shows a longitudinal section of the sensor assembly and a magnet (not attached to the assembly)

FIG. 7a shows a top view of an embodiment of the presently disclosed sensor assembly. The width of the assembly is approximately 15 mm and the approximate length is 200 mm. The assembly has a plastic cover. The top view is intended to give an example of external dimensions and point out the location of the cross-sections B-B, A1-A1, A2-A2, and A3-A3 of FIG. 7b-7e.

FIG. 7b shows a longitudinal section of an embodiment of the sensor assembly, section B-B. The height (thickness) of the assembly in the example is 4.25 mm. A magnet 71 is placed outside the plastic cover. The magnet (actuation unit) is not attached to the assembly in this configuration. The example illustrates how the magnet is placed in a recessed position in terms of total height of the assembly and magnet. In this example the magnet is not attached to the assembly but typically on e.g. the casement frame of the window. When the window (or door) is closed the magnet slides into the lower section of the assembly from the side.

Figure 7C:
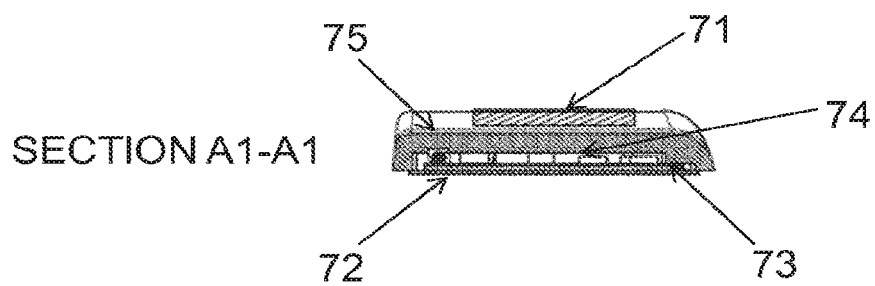

FIG. 7c shows a cross-section of an embodiment of the sensor assembly, section A1-A1 at the magnet 71, which is located on the upper side of the plastic cover 75. In this assembly, the plastic cover is glued on top of the PCB to form a moisture protected unit. An adhesive tape is mounted on the PCB for simple installation in the window or door void.

Figure 7D:
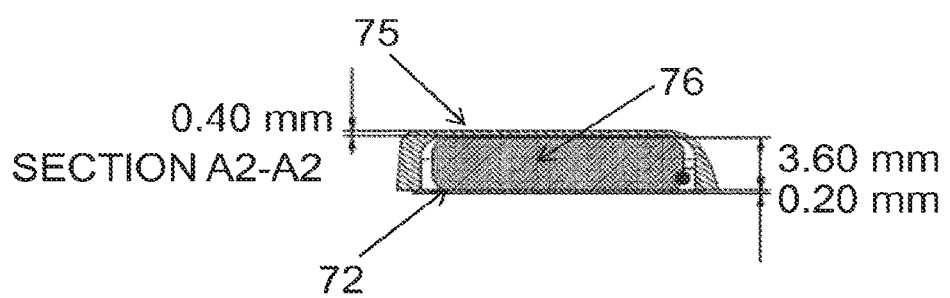

FIG. 7d shows a cross-section of an embodiment of the sensor assembly, section A2-A2 at the battery 76. The example illustrates possible heights (thickness) of the different layers of the assembly. At this cross-section, the thickness of the battery 76 is 3.60 mm, the upper plastic cover 75 0.40 mm, and the lid 72 0.20 mm.

Figure 7E:
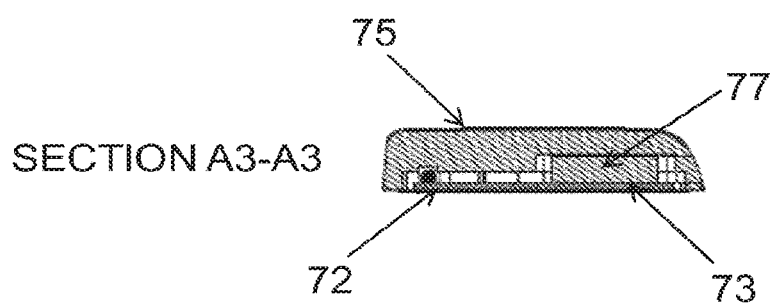

FIG. 7e shows a cross-section of an embodiment of the sensor assembly, section A3-A3. In addition to the lid 72, the printed circuit board 73 and the plastic cover 75, the figure shows a cross-section of a magnetically activated sensor 77.

Figure 8:
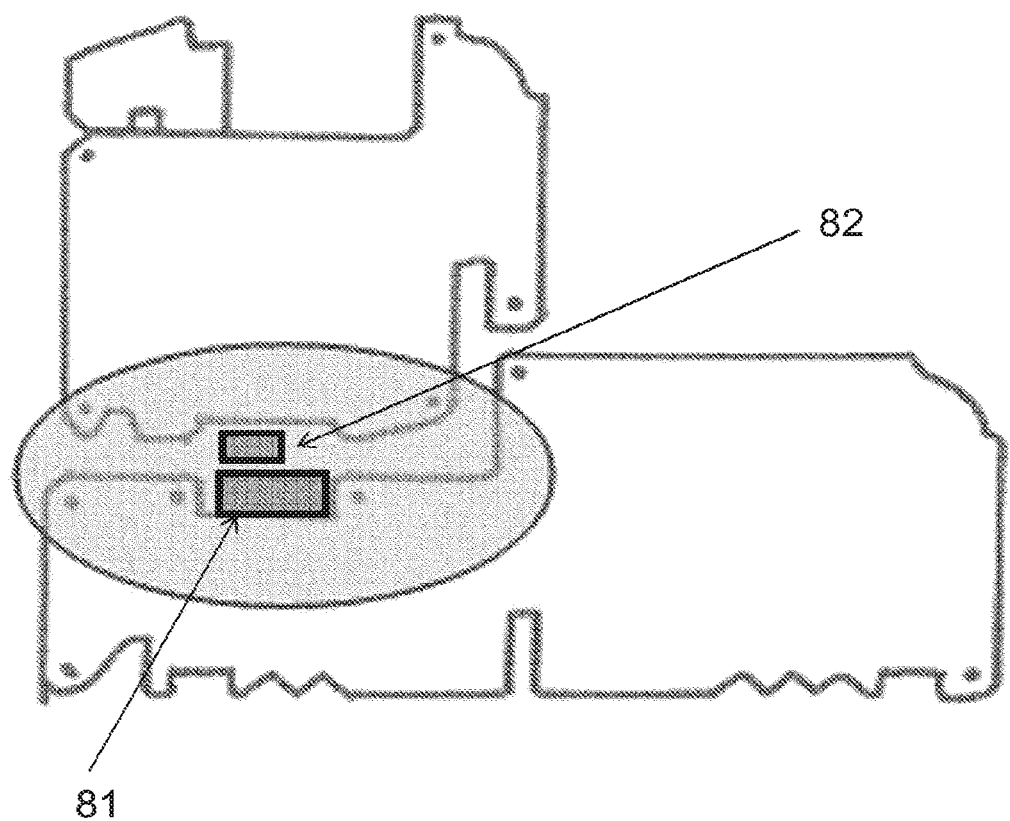
FIG. 8 shows another cut-out illustration of a casement window in closed position.

FIG. 8 shows a side-view cut-out illustration of a casement window in closed position with an embodiment of the presently disclosed sensor assembly and a magnet for actuating the sensor. In the example the sensor assembly 81 is attached to the frame, and the magnet 82 is attached to the window.

Figure 9B:
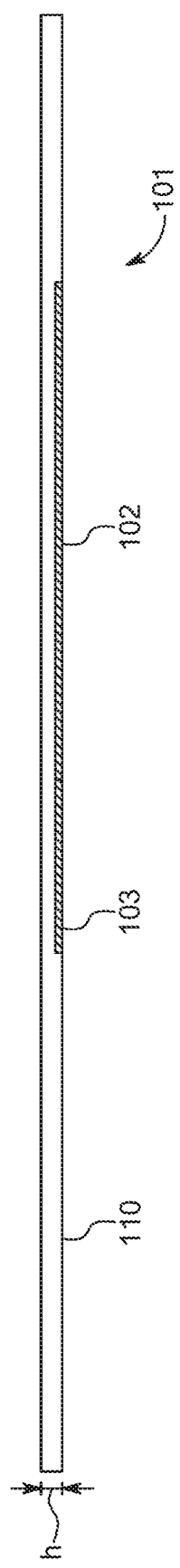

FIG. 9A shows an embodiment of an elongated sensor assembly (101) with double capacitive areas (102, 103) and a ground plane (104) on the bottom side of the assembly. The assembly comprises a capacitive sensor (105). The assembly has two longer edges, a first edge (108) and a second edge (109). FIG. 9B is a side view of the elongated sensor assembly (101). The elongated sensor assembly has a thickness h. It can be seen that the capacitive areas (102, 103) are part of a PCB (101) which constitutes the bottom side (110) in this embodiment.

Figure 10A:
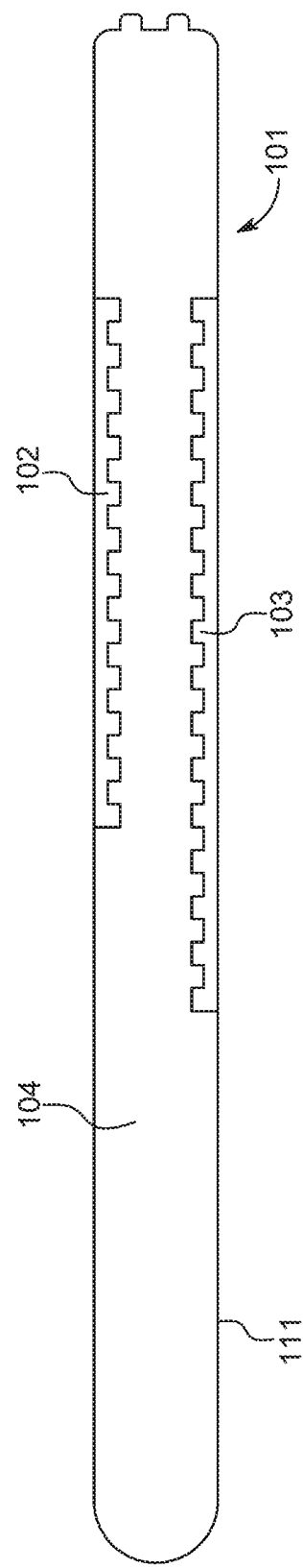
FIGS. 10a, 10b, and 10c show an embodiment of an elongated moisture sensor assembly kit comprising an elongated sensor assembly and a mounting element with two incorporated moisture absorbing elements.
Figure 10B:
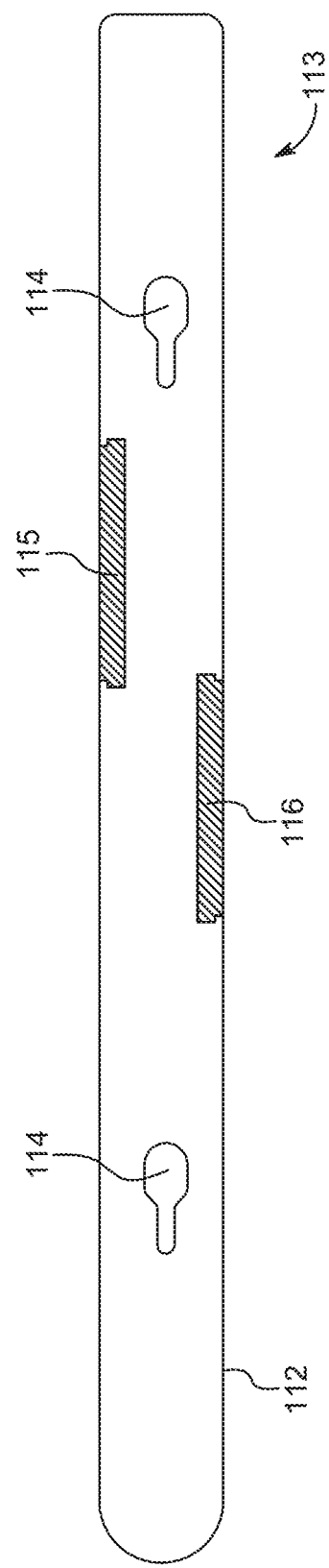
Figure 10C:
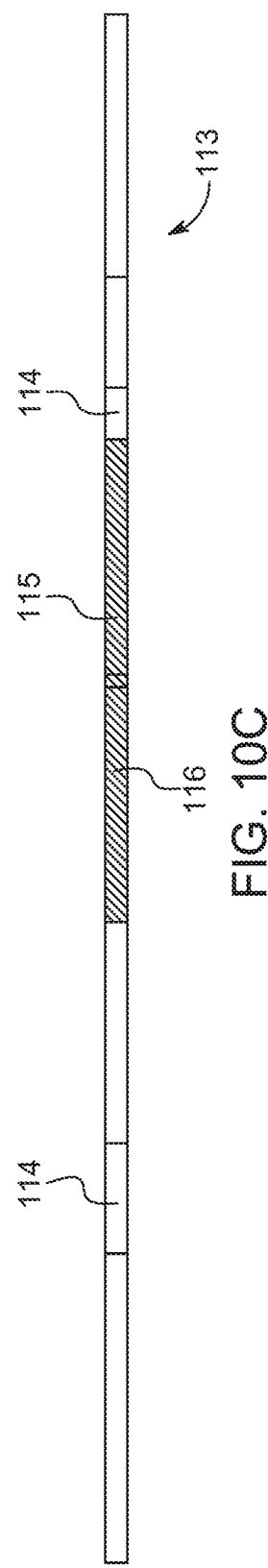

FIG. 10A shows an embodiment of an elongated sensor assembly (101) of an elongated moisture sensor assembly kit. FIG. 10B shows the mounting element (113) in the form of a plastic thin plate. The mounting element (113) comprises two incorporated moisture absorbing elements (115, 116) and two screw holes (114). It can be seen that the contour (112) of the mounting element (113) matches the contour (111) of the elongated sensor assembly (101). In a mounted position, when the elongated sensor assembly (101) and the mounting element (113) are attached or stacked on top of each other, each moisture absorbing element (115, 116) covers a capacitive area (102, 103) and a part of the ground plane. FIG. 10C shows a side view of the mounting element (113).

Figure 11A:
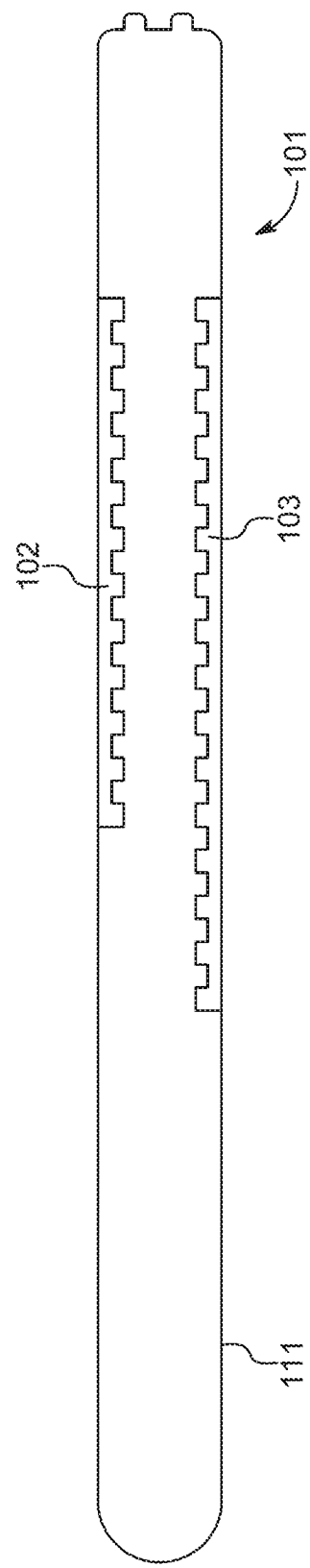
FIGS. 11a, 11b, and 11c show a wireless alarm system comprising an elongated sensor assembly and a conductive element for tampering protection in the form of a conducting tape.
Figure 11B:
Figure 11C:
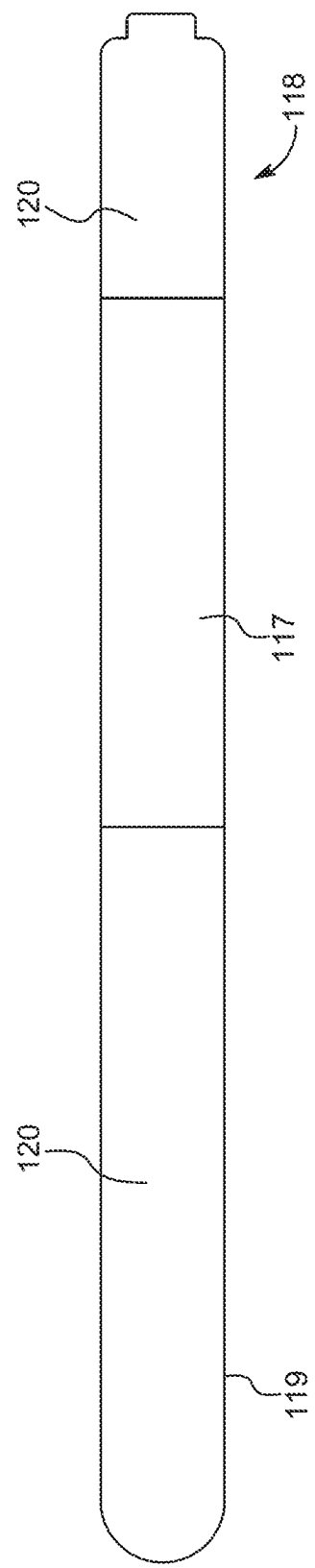

FIG. 11A shows an embodiment of an elongated sensor assembly (101) of a wireless alarm system. FIG. 11B shows a conductive tape (117) adapted to cover both capacitive areas (102, 103). FIG. 11C shows an adhesive plastic sheet (118), which is divided into a conductive tape section (117) and two non-conductive plastic sections (120). It can be seen that the contour (119) of the adhesive plastic sheet (118) matches the contour (111) of the elongated sensor assembly (101).

Figure 12A:
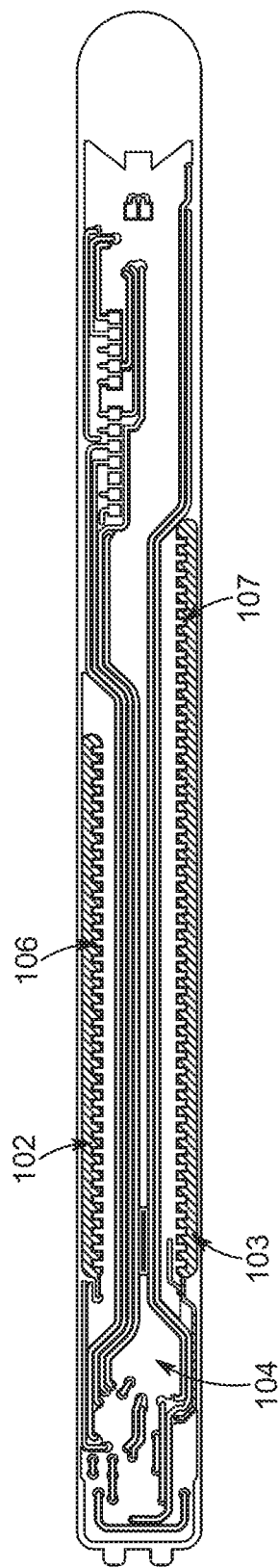
FIGS. 12a and 12b show a bottom side in the form of a printed circuit board of an elongated sensor assembly.
Figure 12B:
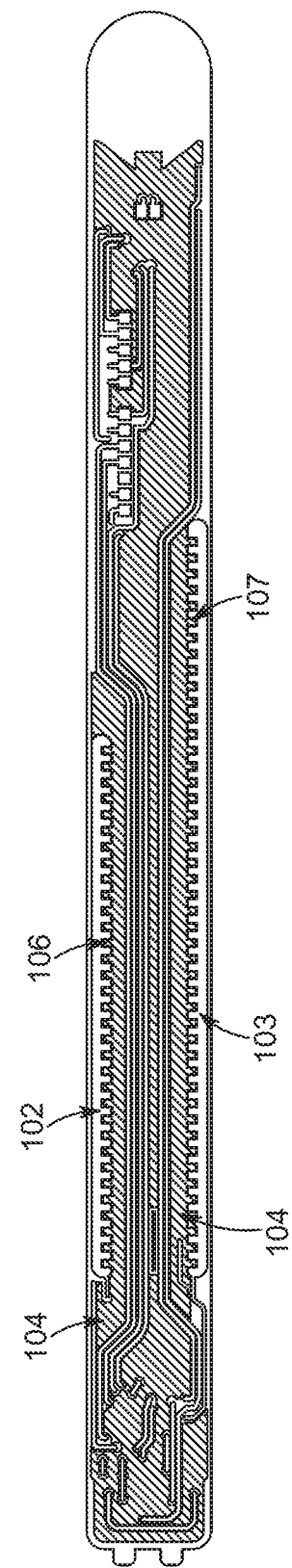

FIGS. 12A and 12B show a bottom side in the form of a printed circuit board of an elongated sensor assembly. In FIG. 12A, the bottom side (backside) of the printed circuit board has two capacitive areas (102, 103) arranged at opposite edges of the elongated sensor assembly. A first isolation layer (106) separates the first capacitive area (102) from the ground plane (104). A second isolation layer (107) separates the second capacitive area (103) from the ground plane (104). FIG. 12B shows the same printed circuit board as FIG. 12B wherein the ground plane (104) has been highlighted. It can be seen that the ground plane (104) extends over the whole printed circuit board and is separated from the capacitive areas (102, 103) by a square wave shaped isolation barriers (106, 107).

FURTHER DETAILS OF THE INVENTION

58. An elongated sensor assembly for detecting a change of state comprising:
   at least one sensor switch configured to detect a given state and a change of state between the given state and at least one other state;
   a microprocessor configured to detect the change of state of the at least one sensor switch;
   an antenna system;
   a wireless transceiver configured to receive a signal from the microprocessor identifying the change of state of the at least one sensor switch and transmit the signal by the antenna system; and
   a power source for providing electric power to the microprocessor, the at least one sensor switch, and the wireless transceiver;
   wherein a bottom side of the sensor assembly comprises a ground plane and at least a first capacitive area in connection with a capacitive sensor, wherein the microprocessor is further configured to detect a change of capacity level of the capacitive sensor in response to an externally generated change in conductivity between the ground plane and the least first capacitive area.

59. The elongated sensor assembly according to item 58, further comprising a second capacitive area.

60. The elongated sensor assembly according to any of items 58-59, wherein the at least first capacitive area is separated from the ground plane by a first isolation layer, preferably wherein the first isolation layer is integrated in the bottom side of the sensor assembly, and/or wherein the second capacitive area is separated from the ground plane by a second isolation layer.

61. The elongated sensor assembly according to any of items 58-61, wherein the first and/or second isolation layers are shaped, such as convoluted, to increase the capacitive area, and/or to increase the area between the capacitive area and the ground plane.

62. The elongated sensor assembly according to any of items 58-60, wherein the first and/or second isolation layers are square wave shaped, triangular, or substantially finger-shaped.

63. The elongated sensor assembly according to any of items 58-62, wherein the first capacitive area abuts a first edge of the elongated sensor assembly, preferably a first of the longer edges of the elongated sensor assembly.

64. The elongated sensor assembly according item 63, wherein the second capacitive area abuts a second edge of the elongated sensor assembly, preferably a second of the longer edges of the elongated sensor assembly, opposite of the first of the longer edges.

65. The elongated sensor assembly according to any of items 58-64, wherein the ground plane, the first capacitive area, optionally the second capacitive area, optionally the first and/or second isolation layer (a) is are part of a PCB, wherein the PCB constitutes the bottom side of the elongated sensor assembly.

66. The elongated sensor assembly according to any of items 58-65, wherein the at least one sensor switch, the microprocessor, the antenna system, the wireless transceiver, and the power source are incorporated in the elongated sensor assembly, the assembly having a maximum height of less than 5 mm.

67. An elongated moisture sensor assembly kit comprising the elongated sensor assembly according to any of items 58-66 and at least one moisture absorbing element.

68. The elongated moisture sensor assembly kit according to item 67, wherein the at least one moisture absorbing element is dimensioned to fit the first and/or second capacitive area(s) and at least a part of the ground plane.

69. The elongated moisture sensor assembly kit according to any of items 66-68, further comprising a mounting element having a contour matching the contour of the elongated sensor assembly.

70. The elongated moisture sensor assembly kit according to item 69, wherein the moisture absorbing element(s) is/are incorporated in the mounting element, and wherein the absorbing element(s) is/are located to fit the first and/or second capacitive areas in a mounted configuration.

71. The elongated moisture sensor assembly kit according to any of items 69-70, wherein the mounting element is a thin, such as less than 7 mm, preferably less than 5 mm, more preferably less than 3 mm, plate.

72. The elongated moisture sensor assembly kit according to any of items 70-71, wherein the mounting element has screw holes for mounting said mounting element to an object.

73. The elongated moisture sensor assembly kit according to any of items 71-72, wherein the mounting element comprises a first adhesive surface for attaching said mounting element to the elongated sensor assembly.

74. The elongated moisture sensor assembly kit according to any of items 69-73, wherein the mounting element comprises a second adhesive surface for attaching said mounting element to an object.

75. A wireless alarm system comprising the elongated sensor assembly according to any of items 58-74 and a conductive element, preferably in the form of a conducting tape, such as a metallic tape.

76. The wireless alarm system according to item 75, wherein the conductive element is dimensioned to fit at least a part of the first and/or second capacitive area(s) and at least a part of the ground plane.

77. The wireless alarm system according to any of items 75-76, wherein the conductive element is dimensioned to fit both a part of the first capacitive area and a part of the second capacitive area, and at least a part of the ground plane of the elongated sensor assembly.

78. The wireless alarm system according to any of items 75-77, wherein the conductive tape comprises an adhesive layer on both sides.

79. The wireless alarm system according to any of items 75-78, wherein the conductive tape is more adhesive on a second side than on a first side.

80. The wireless alarm system according to item 79, wherein the first side is attached to the bottom side of the bottom side of the elongated sensor assembly.

81. The wireless alarm system according to any of items 79-80, wherein the conductive tape further comprises a removable film on the second side.

82. The wireless alarm system according to any of items 75-81, further comprising an adhesive sheet, such as an adhesive plastic sheet, having a contour matching the contour of the elongated sensor assembly, and wherein the conductive tape is an integral part of the adhesive sheet.

83. The wireless alarm system according to item 82, wherein the conductive tape is a section of the adhesive sheet.

84. The wireless alarm system according to any of items 82-83, wherein the conductive tape is arranged in the adhesive sheet such that conductive tape fits the first and/or second capacitive areas when the adhesive sheet is attached to the elongated sensor assembly such that the contours coincide.

85. The wireless alarm system according to any of items 75-84, wherein the microcontroller is configured to transmit a tamper indication if the elongated sensor assembly is removed from the conductive tape.

86. The wireless alarm system according to any of items 75-85, further comprising at least one actuation unit for actuating the sensor switch.

87. The wireless alarm system according to item 86, wherein the at least one actuation unit comprises a magnet.

88. The wireless alarm system according to item 87, wherein magnet is arranged in proximity, such as attached to, the first and/or second capacitive areas, and the elongated sensor assembly is configured in a deep sleep mode.

89. The wireless alarm system according to item 88, wherein the microprocessor is configured to auto-include the elongated sensor assembly in a system when the magnet is removed from the first and/or second capacitive areas.

The invention claimed is:

1. A method for providing a wireless alarm sensor for a building entrance of the type having a frame portion, a window or door portion and a narrow void defined between the frame portion and the window or door portion when the building entrance is closed, the method comprising:
   providing an elongated sensor assembly comprising:
      a printed circuit board having a generally flat surface;
      at least one sensor switch disposed on the generally flat surface of the printed circuit board, and configured to detect a given state and a change of state between the given state and at least one other state;
      a microprocessor disposed on the generally flat surface of the printed circuit board and configured to detect the change of state of the at least one sensor switch;
      an antenna system disposed on the generally flat surface of the printed circuit board;
      a wireless transceiver disposed on the generally flat surface of the printed circuit board, and configured to receive a signal from the microprocessor identifying the change of state of the at least one sensor switch and transmit the signal by the antenna system; and
      a battery having a thin and elongated form factor and being disposed on the generally flat surface of the printed circuit board for providing electric power to the microprocessor, the at least one sensor switch, and the wireless transceiver; and
   a container for the sensor assembly, wherein the printed circuit board forms a lid of the container;
      wherein the elongated sensor assembly has a thin and elongated form factor with a maximum height of less than 5 mm and a length of at least 100 mm such that the elongated sensor assembly is adapted to be mounted in the narrow void of the building entrance on a first plane surface of the frame portion or the window or door portion; and
      mounting the elongated sensor assembly in the narrow void of the building entrance on the first plane surface of the frame portion or the window or door portion without modifying the frame portion or the window or door portion.

2. The method according to claim 1, wherein the elongated sensor assembly is mounted on the first plane surface of the frame portion and the at least one separate actuation unit is mounted on a second plane surface of the window or door portion facing the first place surface.

3. The method according to claim 1, wherein a housing of the elongated sensor assembly is adhesive or comprises an adhesive surface, wherein the elongated sensor assembly is attached to the frame portion or the window or door portion using the adhesive surface.

4. The method according to claim 3, wherein the at least one separate actuation unit is attached to the frame portion or the window or door portion using an additional adhesive surface.

5. The method according to claim 1, wherein the elongated sensor assembly further comprises an additional sensor selected from the group consisting of:
   a light sensor configured to detect a level and/or a change of ambient light condition;
   a temperature sensor configured to detect a level and/or a change of ambient temperature;
   a humidity sensor configured to detect a level or a change in ambient humidity;
   a sensor configured to detect if someone tries to tamper with the sensor assembly;

an air pressure meter to detect a changed pressure caused by an opened window or crossed glass;

a proximity sensor to detect the presence of an object in a close environment;

a motion sensor configured to detect movement adjacent to the sensor assembly; and an accelerometer or vibration sensor configured to detect movement of the sensor assembly.

6. The method according to claim 1, wherein the sensor switch comprises a light sensitive sensor and a light emitter.

7. The method according to claim 6, wherein the light sensitive sensor is an infrared light sensor, and wherein the light emitted is an infrared LED emitter.

8. The method according to claim 7, wherein the light emitter and light sensitive sensor are arranged in different compartments inside the housing.

9. The method according to claim 6, wherein the light emitter is configured to generate light pulses and the light sensitive sensor is configured to sense reflected light pulses sent from the light emitter to detect whether the door or window is open or closed.

10. The method according to claim 1, wherein the lid of the container consists of the printed circuit board, the method further comprising sealing the container with the lid.

11. An elongated sensor assembly for a wireless alarm system for detecting a change of state, comprising:

at least one sensor switch configured to detect a given state and a change of state between the given state and at least one other state;

a microprocessor configured to detect the change of state of the at least one sensor switch;

an antenna system;

a wireless transceiver configured to receive a signal from the microprocessor identifying the change of state of the at least one sensor switch and transmit the signal by the antenna system;

a thin and elongated battery for providing electric power to the microprocessor, the at least one sensor switch, and the wireless transceiver; and a printed circuit board, wherein the at least one sensor switch, the microprocessor, the antenna system, the wireless transceiver, and the thin and elongated battery are disposed on the printed circuit board such that the elongated sensor assembly has a thin and elongated form factor with a maximum height of less than 5 mm and a length of at least 100 mm, wherein the elongated sensor assembly is adapted to be mounted on a plane surface; and a container for the sensor assembly, wherein the printed circuit board forms a lid of the container.

12. The elongated sensor assembly according to claim 11, wherein the battery has a length being a major part of the total length of the elongated sensor assembly.

13. The elongated sensor assembly according to claim 11, wherein said sensor assembly is adapted to be mounted in the opening, void or cavity without modification of the opening, void or cavity.

14. The elongated sensor assembly according to claim 11, wherein the opening, void or cavity is a narrow void defined between the frame and the window or door, said sensor assembly being adapted to be mounted in the narrow void on a first plane surface of the frame and window or door, of a building entrance, without modification of the frame or window/door.

15. The elongated sensor assembly according to claim 11, wherein the at least one sensor switch is configured to detect a change in position of the at least one actuation unit.

16. The elongated sensor assembly according to claim 15, wherein at least a part of a bottom surface of the elongated sensor assembly is adhesive and wherein at least a part of a surface of the actuation unit is adhesive.

17. The elongated sensor assembly according to claim 11, wherein the at least one sensor switch is a magnetically activated reed switch, or a Hall sensor, or a magnetoresistive sensor.

18. The elongated sensor assembly according to claim 11, wherein the elongated sensor assembly comprises a light sensitive sensor and a light emitter, wherein the light emitter is configured to generate light pulses and the light sensitive sensor is configured to sense reflected light pulses sent from the light emitter to detect whether the door or window is open or closed.

19. The elongated sensor assembly according to claim 11, wherein the lid of the container consists of the printed circuit board.

20. The elongated sensor assembly according to claim 19, wherein the lid seals the container.

* * * * *